(12) United States Patent
Liaghati et al.

(10) Patent No.: US 12,326,350 B2
(45) Date of Patent: Jun. 10, 2025

(54) REAL-TIME ONBOARD STANDALONE SENSOR THERMAL COMPENSATION (RToB SSTC) TECHNIQUES AND TOOLS FOR INDUCED ERROR REDUCTION

(71) Applicant: The Boeing Company, Chicago, IL (US)

(72) Inventors: Amir Leon Liaghati, Huntsville, AL (US); Eric Benjamin Delmonico, Madison, AL (US)

(73) Assignee: THE BOEING COMPANY, Arlington, VA (US)

( * ) Notice: Subject to any disclaimer, the term of this patent is extended or adjusted under 35 U.S.C. 154(b) by 620 days.

(21) Appl. No.: 17/573,772

(22) Filed: Jan. 12, 2022

(65) Prior Publication Data

US 2022/0299346 A1  Sep. 22, 2022

Related U.S. Application Data

(60) Provisional application No. 63/161,566, filed on Mar. 16, 2021.

(51) Int. Cl.
*G01D 18/00* (2006.01)
*G01K 7/14* (2006.01)
*G01K 7/16* (2006.01)

(52) U.S. Cl.
CPC ............ *G01D 18/008* (2013.01); *G01K 7/14* (2013.01); *G01K 7/16* (2013.01)

(58) Field of Classification Search
None
See application file for complete search history.

(56) References Cited

U.S. PATENT DOCUMENTS

| | | | |
|---|---|---|---|
| 4,658,651 A * | 4/1987 | Le | G01L 9/065 29/621.1 |
| 5,460,049 A * | 10/1995 | Kirsch | G01L 9/065 73/152.52 |
| 6,681,145 B1 | 1/2004 | Greenwood et al. | |
| 9,986,660 B2 | 5/2018 | Butscher et al. | |
| 2020/0191665 A1* | 6/2020 | Fleissner | G01L 1/2287 |
| 2023/0054694 A1* | 2/2023 | Fremaux | G01D 3/0365 |

* cited by examiner

*Primary Examiner* — Raymond L Nimox
(74) *Attorney, Agent, or Firm* — COATS & BENNETT, PLLC

(57) ABSTRACT

A method for reducing thermal induced error in real-time for a sensor in a region of interest. The method includes receiving at least one data point from a temperature sensor, the temperature sensor configured to determine temperature for the sensor of interest. The method includes receiving at least one data point from the sensor, the sensor having thermal sensitivity and offset shift for a given temperature range. The method includes determining at least three percentage change coefficients for thermal sensitivity. The method includes determining at least three percentage change coefficients for thermal zero offset. The method includes calculating real-time thermal error reduction.

20 Claims, 15 Drawing Sheets

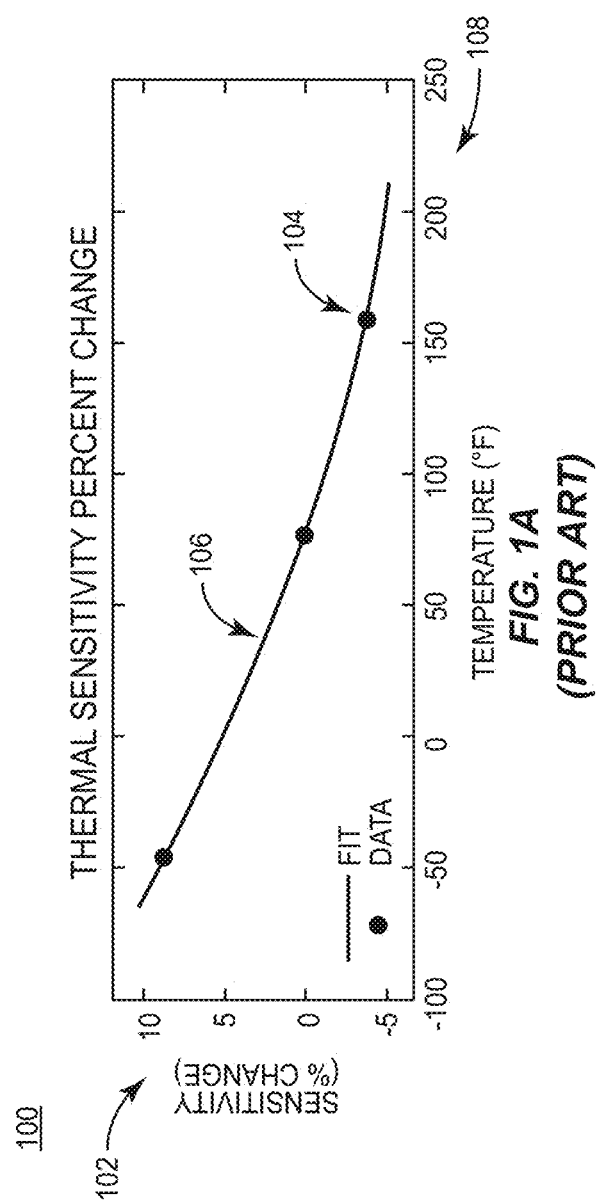
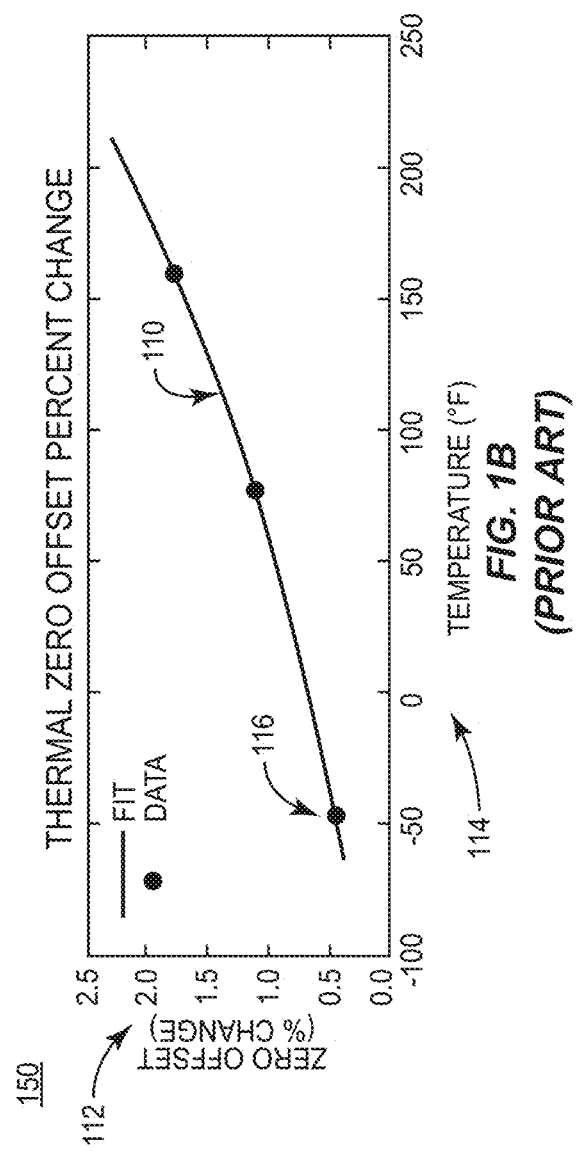

REAL-TIME ONBOARD STANDALONE SENSOR THERMAL COMPENSATION (RToB SSTC) TECHNIQUES AND TOOLS FOR INDUCED ERROR REDUCTION

RELATED APPLICATIONS

This application claims priority from U.S. Provisional App. No. 63/161,566, filed 16 Mar. 2021, the disclosure of which is incorporated by reference herein in its entirety.

GOVERNMENT LICENSE RIGHTS

This invention was made with Government support under NNM07AB03C awarded by the National Aeronautics and Space Administration (NASA). The government has certain rights in this invention.

TECHNOLOGICAL FIELD

The present disclosure relates generally to the field of reducing thermal induced error. More specifically the present disclosure relates to the field of real-time onboard standalone sensor thermal compensation (RTOB SSTC) techniques and tools for reducing thermal induced error.

BACKGROUND

Vehicles that require certain parameters should be monitored in real-time and maintained to ensure proper vehicle operation. One way to monitor status of those parameters is through temperature readings.

It is well understood that thermal sensors have temperature reading errors. Often, thermal error encompasses the majority of the error induced in the measurement. To determine voltage/counts to Engineering Units (e.g., g) conversion, the following equation is used: $y_v = m_s x_{EU} + b_z$, where $y_v$ is voltage, $m_s$ is sensitivity, $x_{EU}$ is engineering units, and $b_z$ is zero offset. When temperatures vary to extremes, (e.g., −65° F. or 212° F.), the voltage can change significantly. This leads to errors in readings, which can lead to operational or maintenance considerations, among others.

Existing solutions include post-flight and guess/prediction analysis, which are not automated real-time solutions. Another method is to control the sensor specification at the vendor level, which can drive up cost and lead time. Two thermal error linear coefficients may be given by vendors: $m_s$ and $b_z$. For certain programs, only three temperature values may be provided for $m_s$ and $b_z$ by the vendor. Values between three temperatures are not given. This uncertainty can cause uncertainty such that current solutions may not meet the accuracy requirements by governmental agencies.

FIG. 1A is an illustration of a graphic representation 100 of thermal sensitivity percent change. The y-axis 102 is $m_s$ in percentage change. The x-axis 108 is temperature in Fahrenheit. The data points 104, for example, those provided by a vendor, are shown with a fit line 106.

Similar to FIG. 1A, FIG. 1B is an illustration of a graphic representation 150 of thermal zero offset percent change. The y-axis 112 is $b_z$ in percentage change. The x-axis 114 is temperature in Fahrenheit. The data points 116, for example, those provided by a vendor, are shown with a fit line 110.

Thermal sensor deviations are difficult to determine with only the data points given without further calculations or measurements. With such deviations, issues such as operational or maintenance concerns can arise. Therefore, there is a need for a thermal measurement solution that provides results in real-time.

SUMMARY

According to one aspect of the present application, a system is disclosed for reducing thermal induced error in real-time for a sensor in a region of interest of a vehicle. The system includes a temperature sensor, the temperature sensor configured to determine a temperature for a sensor of interest. The sensor of interest has a thermal sensitivity and an offset shift for a given temperature range. The system has a memory and a processor coupled to the memory. The processor is configured to execute instructions to calculate real-time sensor thermal error reduction data, wherein the calculation comprises using polynomial functions within a temperature reading range determined by the temperature sensor, wherein the polynomial functions are based on preloaded data for the sensor of interest.

According to further aspects, the preloaded data comprises thermal sensitivity and zero shift data.

According to further aspects, the processor is configured to use the real-time thermal error reduction data to perform real-time thermal compensation for the sensor of interest.

According to further aspects, the real-time sensor thermal error reduction further includes using a midpoint temperature error reduction. The using includes determining at least three percentage change coefficients for thermal sensitivity. The using includes determining at least three percentage change coefficients for thermal zero offset. The using includes within the temperature reading range of the temperature sensor, curve-fitting more than one polynomial function using regression analysis. The using includes determining at least two boundary regions for piecewise functions, wherein each of the boundary regions are calculated based on the preloaded data. The using includes selecting a boundary condition to reduce sensor thermal error using at least one of the thermal sensitivity percentage change coefficients and at least one of the thermal zero offset percentage change coefficients.

According to further aspects, the real-time sensor thermal error reduction further includes optimizing error automation. The optimizing includes calculating more than one polynomial function. The optimizing includes using at least one of the polynomial functions, selecting a thermal sensitivity and an offset drift for the preloaded data based on the temperature sensor input. The optimizing includes calculating a first error at a proximate lesser temperature level and a proximate higher temperature level associated with a first temperature reading. The optimizing includes calculating a second error at a proximate lesser temperature level and a proximate higher temperature level associated with a second temperature reading. The optimizing includes identifying a substantially equal calculated error value, wherein the first calculated error and the second calculated error at proximate lesser temperature values and proximate higher temperature values are substantially equal. The optimizing includes designating the substantially equal calculated error value as the maximum error. The optimizing includes using the maximum error for correcting a thermal error outside of a threshold.

According to further aspects, the threshold is calculated using a midpoint error reduction.

According to further aspects, the real-time sensor thermal error reduction further includes calculating the real-time sensor thermal error reduction further comprises three-dimensional lookup error elimination. The elimination includes calculating polynomial functions based on a temperature range for the sensor of interest. The elimination includes constructing a three-dimensional lookup matrix. The three-dimensional lookup matrix is based on polynomial functions. The three-dimensional lookup matrix is comprised of a voltage measurement of the sensor of interest, an engineering unit, and the thermal range of the sensor of interest.

According to further aspects, the temperature sensor comprises at least one of a resistance temperature detector and a thermocouple.

According to further aspects, the sensor of interest comprises at least one of an accelerometer, a strain gauge, a pressure transducer, and a microphone.

According to further aspects, the processor is configured to use the real-time thermal error reduction data to perform real-time thermal compensation for the sensor of interest.

In another aspect, the present application discloses a method for reducing thermal induced error in real-time for a sensor in a region of interest of a vehicle. The method includes receiving at least one data point from a temperature sensor, the temperature sensor configured to determine a temperature for a sensor of interest. The method includes receiving at least one data point from the sensor of interest, the sensor of interest having a thermal sensitivity and an offset shift for a given temperature range. The method includes calculating real-time sensor thermal error reduction data, wherein the calculation comprises using polynomial functions within a temperature reading range determined by the temperature sensor, wherein the polynomial functions are based on preloaded data for the sensor of interest.

According to further aspects, the calculating the real-time sensor thermal error reduction further includes using a midpoint temperature error reduction. The using includes determining at least three percentage change coefficients for thermal sensitivity. The using includes determining at least three percentage change coefficients for thermal zero offset. The using includes within the temperature reading range of the temperature sensor, curve-fitting more than one polynomial function using regression analysis. The using includes determining at least two boundary regions for piecewise functions, wherein each of the boundary regions are calculated based on the preloaded data. The using includes selecting a boundary condition to reduce sensor thermal error using at least one of the thermal sensitivity percentage change coefficients and at least one of the thermal zero offset percentage change coefficients.

According to further aspects, the real-time sensor thermal error reduction further includes optimizing error automation. The optimizing includes calculating more than one polynomial function. The optimizing includes using at least one of the polynomial functions, selecting a thermal sensitivity and an offset drift for the preloaded data based on the temperature sensor input. The optimizing includes calculating a first error at a proximate lesser temperature level and a proximate higher temperature level associated with a first temperature reading. The optimizing includes calculating a second error at a proximate lesser temperature level and a proximate higher temperature level associated with a second temperature reading. The optimizing includes identifying a substantially equal calculated error value, wherein the first calculated error and the second calculated error at proximate lesser temperature values and proximate higher temperature values are substantially equal. The optimizing includes designating the substantially equal calculated error value as the maximum error. The optimizing includes using the maximum error for correcting a thermal error outside of a threshold.

According to further aspects, the threshold is calculated using a midpoint error reduction.

According to further aspects, the method further includes calculating the real-time sensor thermal error reduction further comprises three-dimensional lookup error elimination. The elimination includes calculating polynomial functions based on a temperature range for the sensor of interest. The elimination includes constructing a three-dimensional lookup matrix. The three-dimensional lookup matrix is based on polynomial functions. The three-dimensional lookup matrix is comprised of a voltage measurement of the sensor of interest, an engineering unit, and the thermal range of the sensor of interest.

According to further aspects, the method further includes using the real-time sensor thermal error reduction to perform real-time thermal compensation in the region of interest.

According to further aspects, the method further includes using the real-time thermal sensor data to perform real-time thermal compensation for the sensor of interest.

In another aspect, the present application discloses a non-transitory computer-readable storage medium, which is non-transitory and having computer-readable program code portions stored therein that in response to execution by processing circuitry, for reducing thermal induced error in real-time for a sensor in a region of interest of a vehicle. The non-transitory computer-readable storage medium, in response to execution by processing circuitry, causes an apparatus to at least receive at least one data point from a temperature sensor, the temperature sensor configured to determine temperature for the sensor of interest. The non-transitory computer-readable storage medium, in response to execution by processing circuitry, causes an apparatus to receive at least one data point from a sensor of interest, the sensor of interest having a thermal sensitivity and an offset shift for a given temperature range. The non-transitory computer-readable storage medium, in response to execution by processing circuitry, causes an apparatus to calculate real-time sensor thermal error reduction data, wherein the calculation comprises using polynomial functions within a temperature reading range determined by the temperature sensor, wherein the polynomial functions are based on preloaded data for the sensor of interest.

According to further aspects, the calculating the real-time sensor thermal error reduction further includes using a midpoint temperature error reduction. The using includes determining at least three percentage change coefficients for thermal sensitivity. The using includes determining at least three percentage change coefficients for thermal zero offset. The using includes within the temperature reading range of the first sensor, curve-fitting more than one polynomial function using regression analysis. The using includes determining at least two boundary regions for piecewise functions, wherein each of the boundary regions are calculated based on the preloaded data. The using includes selecting a boundary condition to reduce sensor thermal error using at least one of the thermal sensitivity percentage change coefficients and at least one of the thermal zero offset percentage change coefficients.

According to further aspects, the calculating the real-time sensor thermal error reduction further includes optimizing error automation. The optimizing includes calculating more than one polynomial function. The optimizing includes using at least one of the polynomial functions, selecting a thermal sensitivity and an offset drift for the preloaded data based on the temperature sensor input. The optimizing includes calculating a first error at a proximate lesser temperature level and a proximate higher temperature level associated with a first temperature reading. The optimizing includes calculating a second error at a proximate lesser temperature level and a proximate higher temperature level associated with a second temperature reading. The optimizing includes identifying a substantially equal calculated error value, wherein the first calculated error and the second calculated error at proximate lesser temperature values and proximate higher temperature values are substantially equal. The optimizing includes designating the substantially equal calculated error value as the maximum error. The optimizing includes using the maximum error for correcting a thermal error outside of a threshold.

According to further aspects, the calculating the real-time sensor thermal error reduction further includes three-dimensional lookup error elimination. The elimination includes calculating polynomial functions based on a temperature range for the sensor of interest. The elimination includes constructing a three-dimensional lookup matrix. The three-dimensional lookup matrix is based on polynomial functions. The three-dimensional lookup matrix is comprised of a voltage measurement of the sensor of interest, an engineering unit, and the thermal range of the sensor of interest.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Having thus described variations of the disclosure in general terms, reference will now be made to the accompanying drawings, which are not necessarily drawn to scale, and wherein:

FIG. 1A is an illustration of a known graphic representation of thermal sensitivity percent change.

FIG. 1B is an illustration of a known graphic representation of thermal zero offset percent change.

Figure 2A:
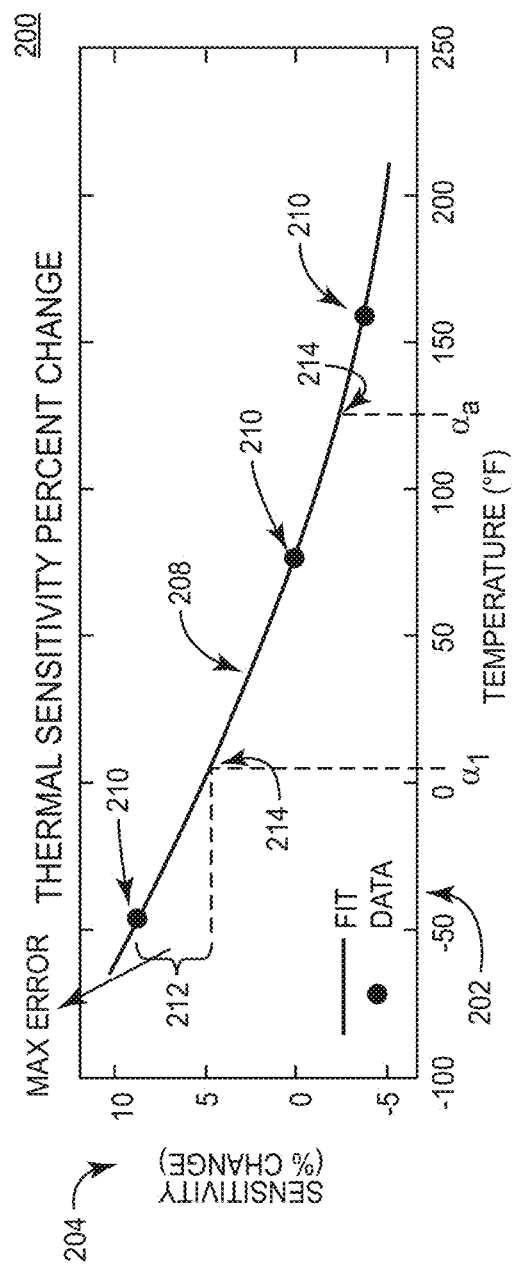

FIG. 2A is an illustration of a graphic representation of thermal sensitivity percent change using midpoint temperature error reduction.

Figure 2B:
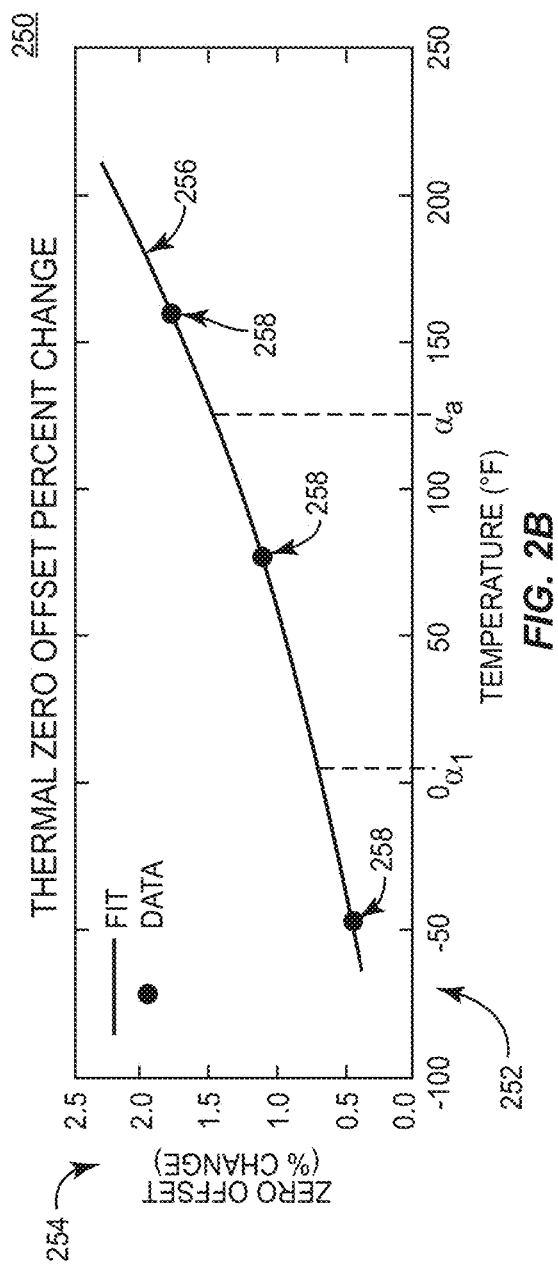

FIG. 2B is an illustration of a graphic representation of thermal zero offset percent change using midpoint temperature error reduction.

Figure 3:
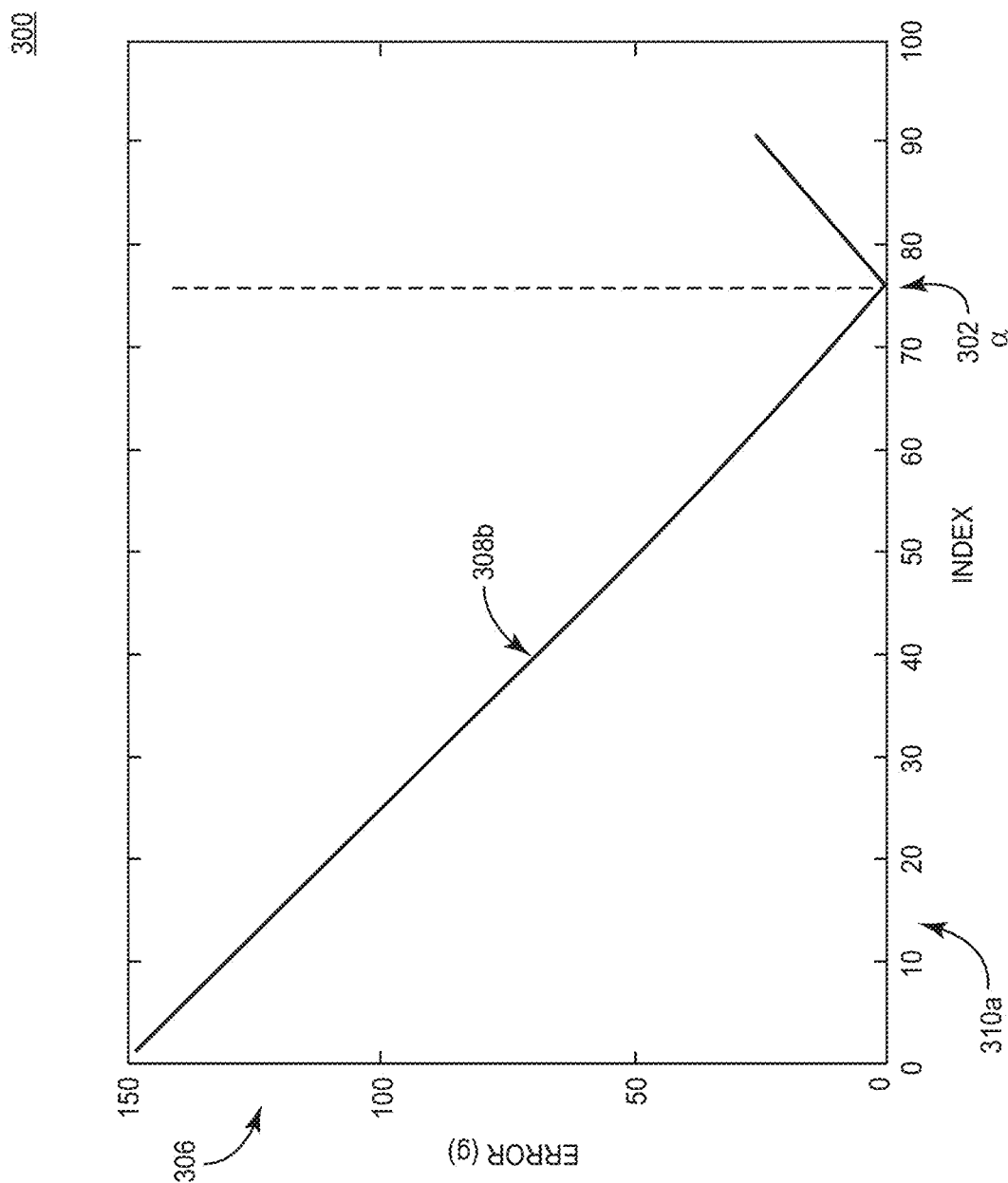

FIG. 3 is an illustration of a graphic representation of thermal compensation using optimization error automation.

Figure 4:
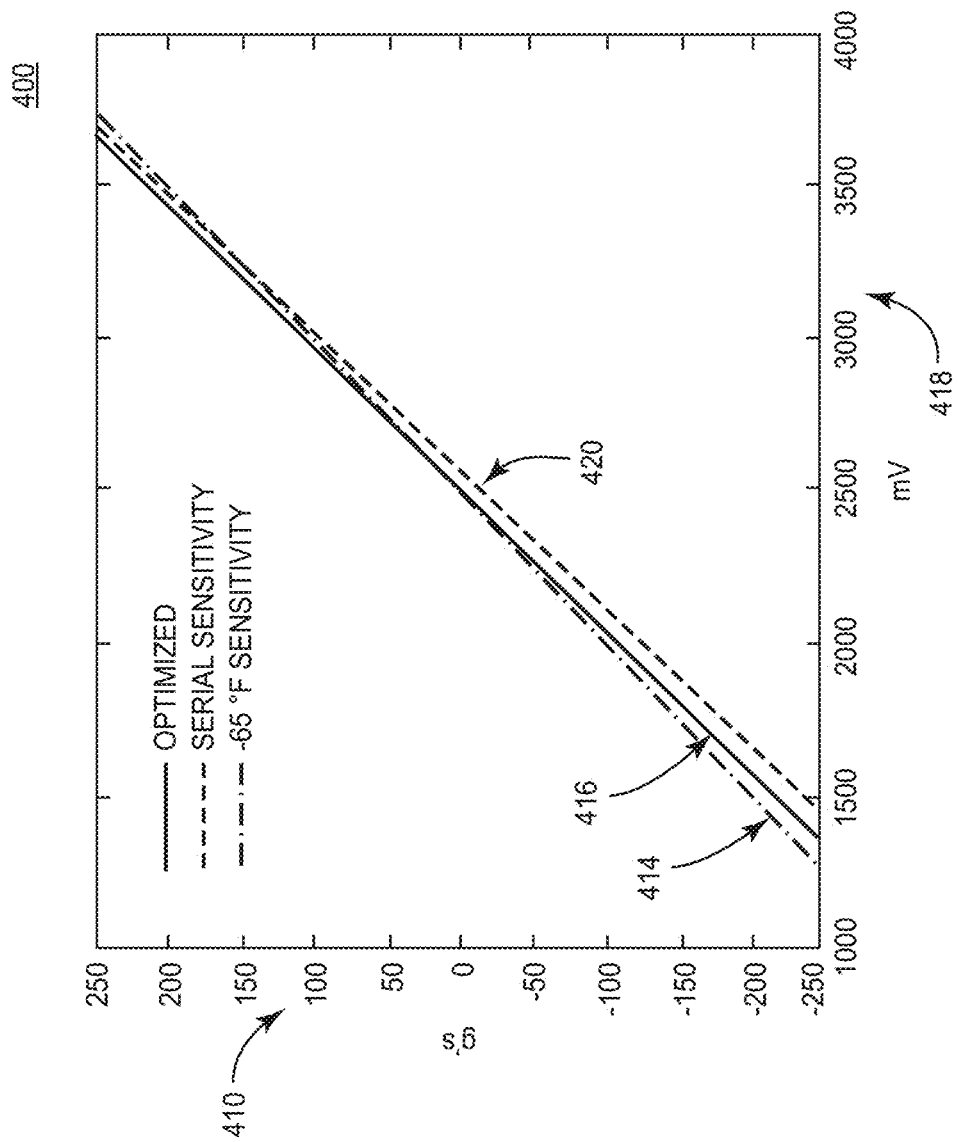

FIG. 4 is an illustration of a graphic representation of thermal compensation using optimization error automation.

Figure 5:
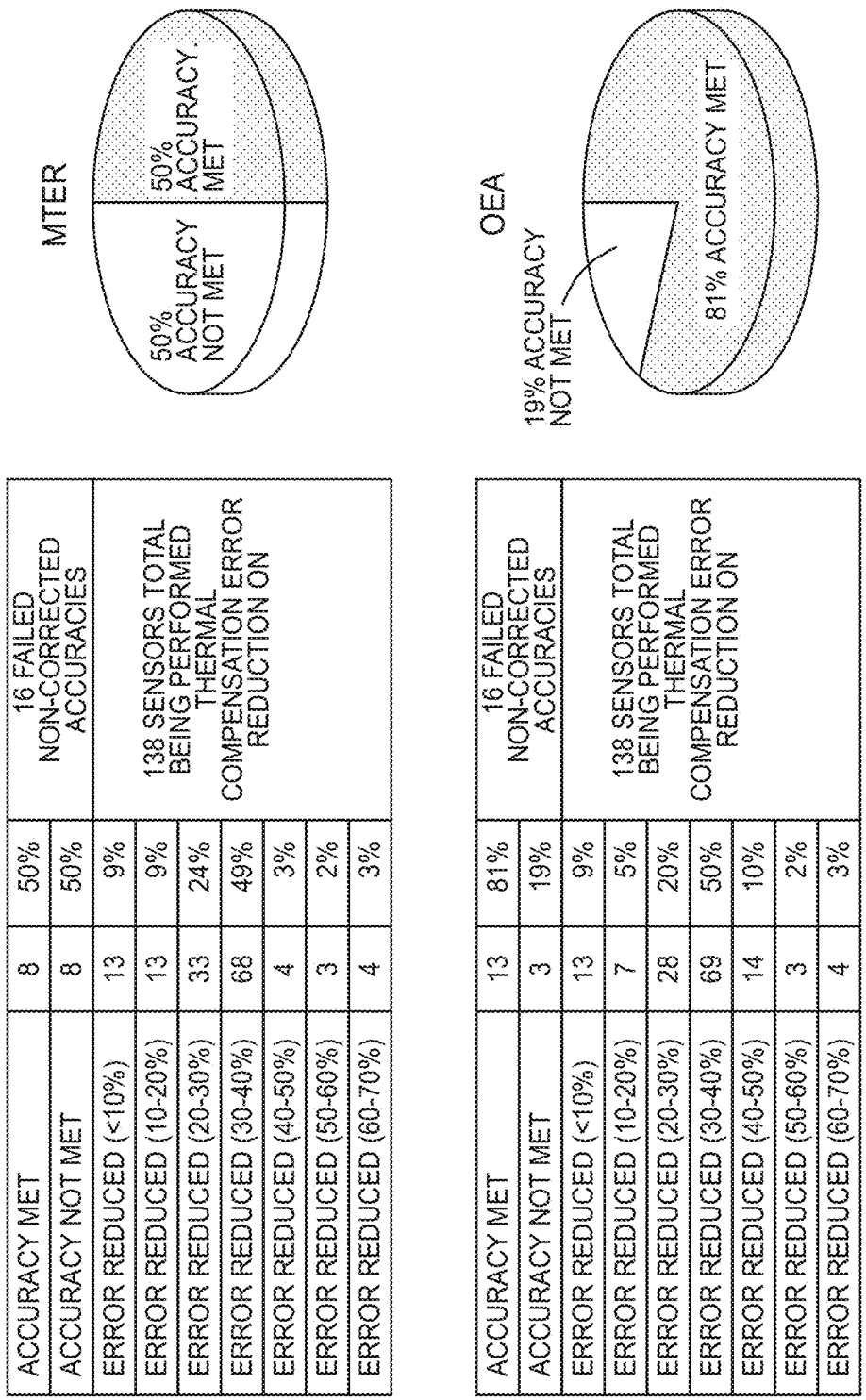

FIG. 5 is an illustration of a graphic representation of midpoint temperature error reduction and optimization error automation.

Figure 6:
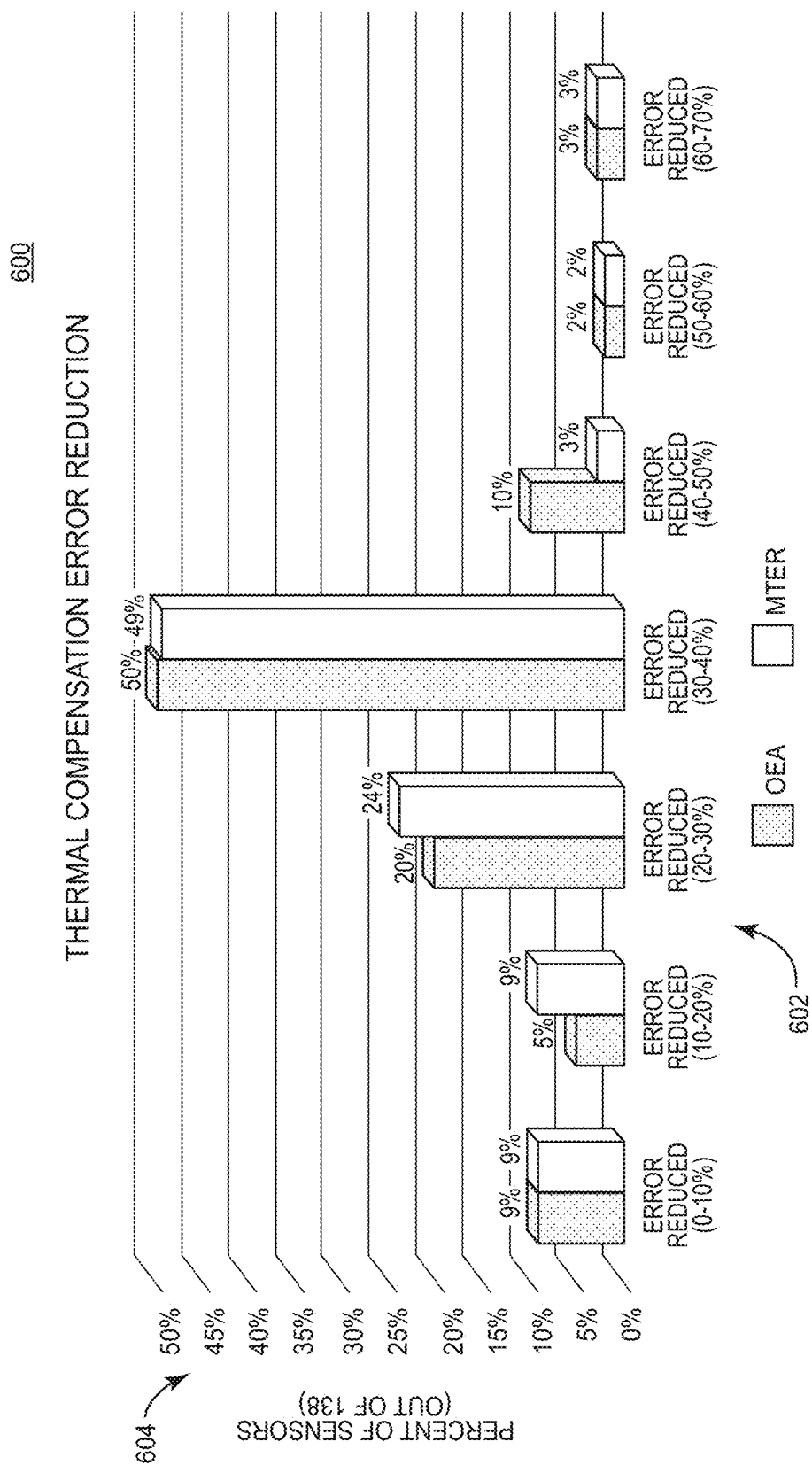

FIG. 6 is an illustration of a graphic representation of midpoint temperature error reduction and optimization error automation.

Figure 7A:
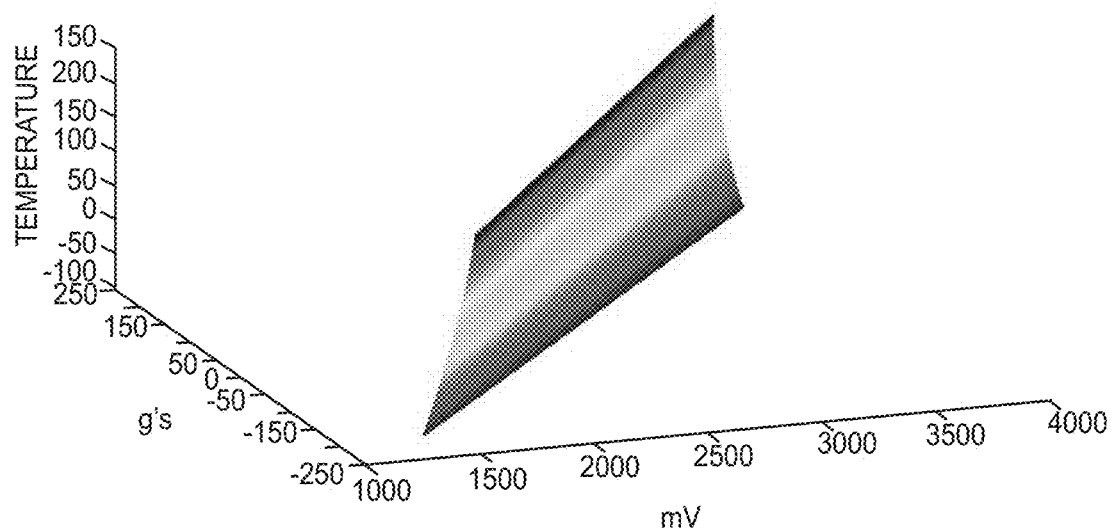

FIG. 7A is an illustration of a graphic representation of three-dimensional lookup error elimination.

Figure 7B:
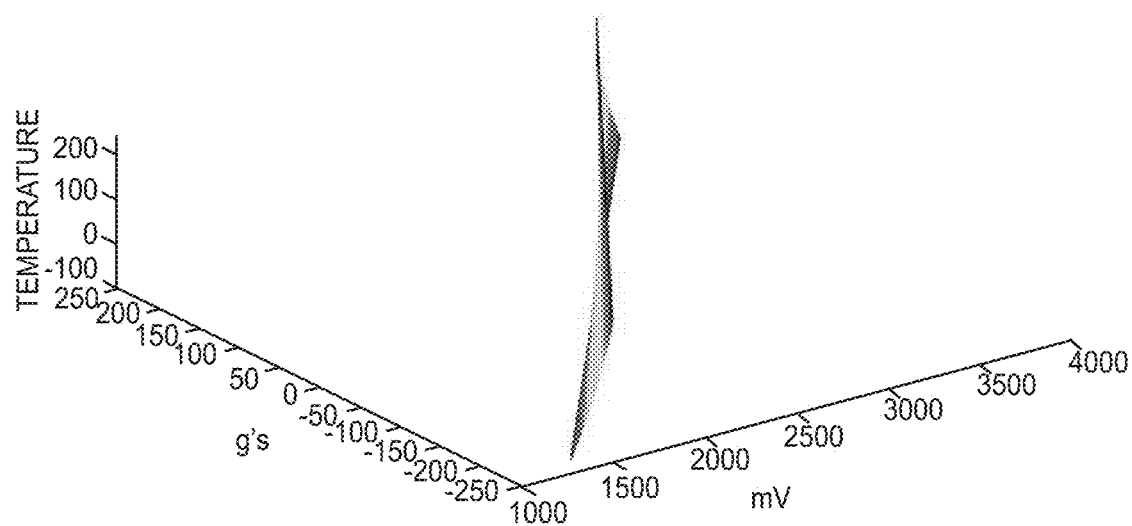

FIG. 7B is an illustration of a graphic representation of three-dimensional lookup error elimination.

Figure 8A:
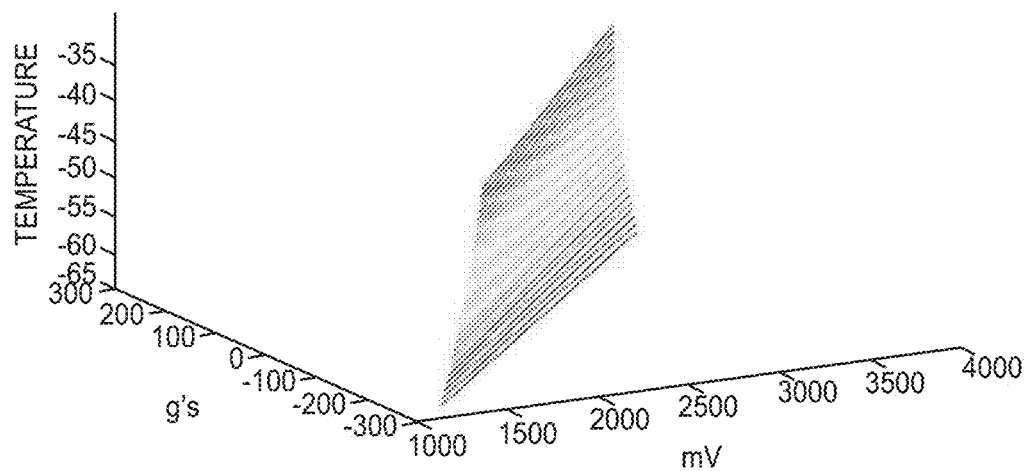

FIG. 8A is an illustration of a graphic representation of three-dimensional lookup error elimination.

Figure 8B:
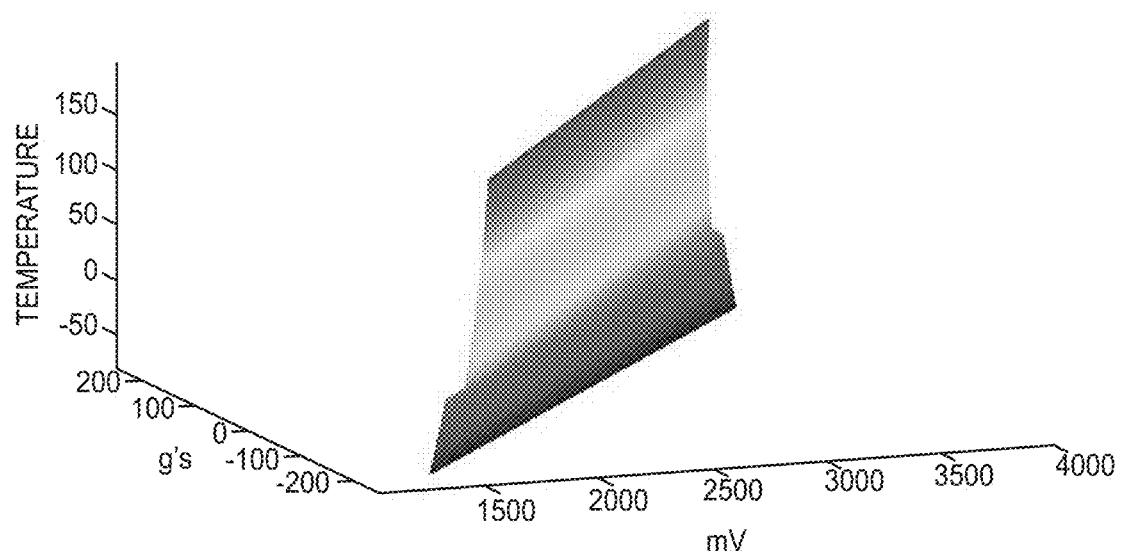

FIG. 8B is an illustration of a graphic representation of three-dimensional lookup error elimination.

Figure 9:
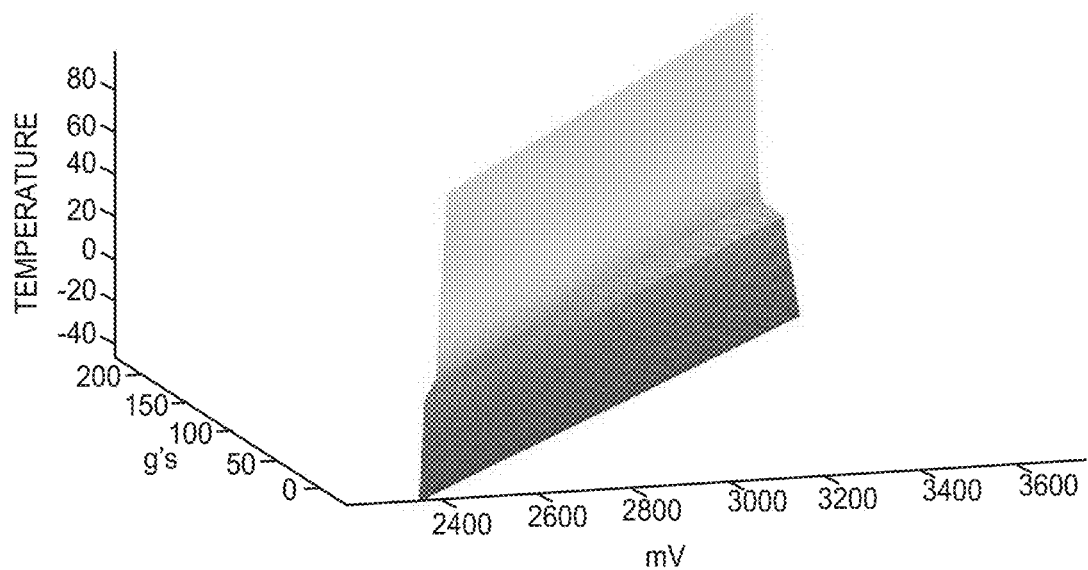

FIG. 9 is an illustration of a graphic representation of three-dimensional lookup error elimination.

Figure 10:
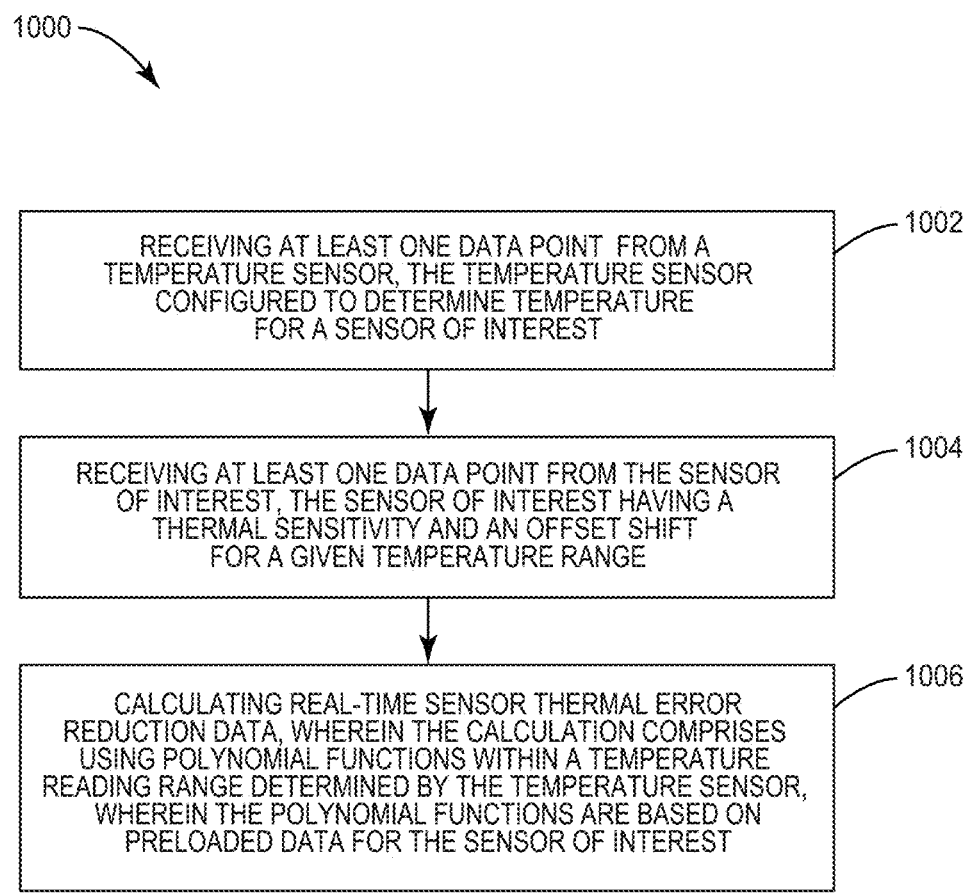

FIG. 10 is a flow chart of a method for reducing thermal error real-time for a sensor in a region of interest of a vehicle.

Figure 10A:
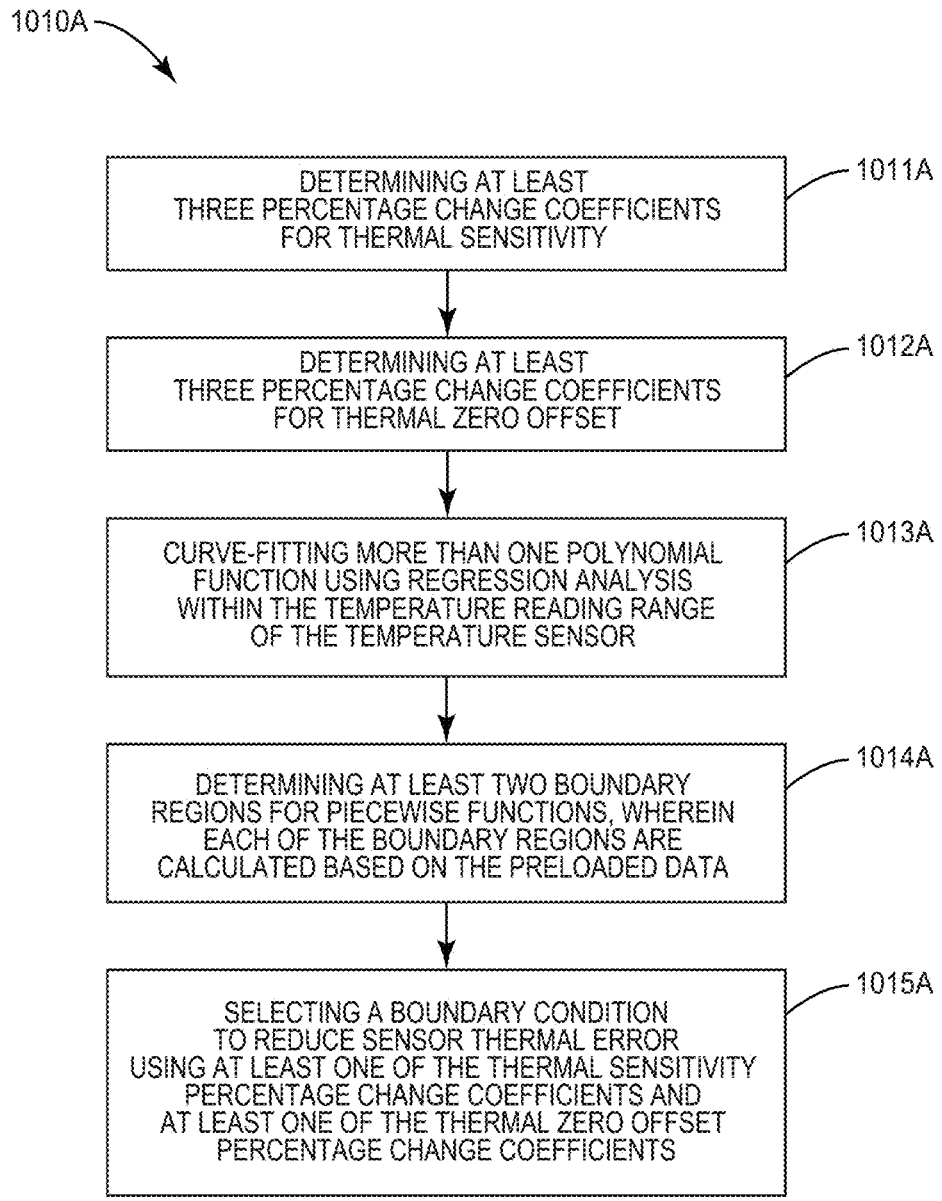

FIG. 10A is a flow chart of a method for using a midpoint temperature error reduction.

Figure 10B:
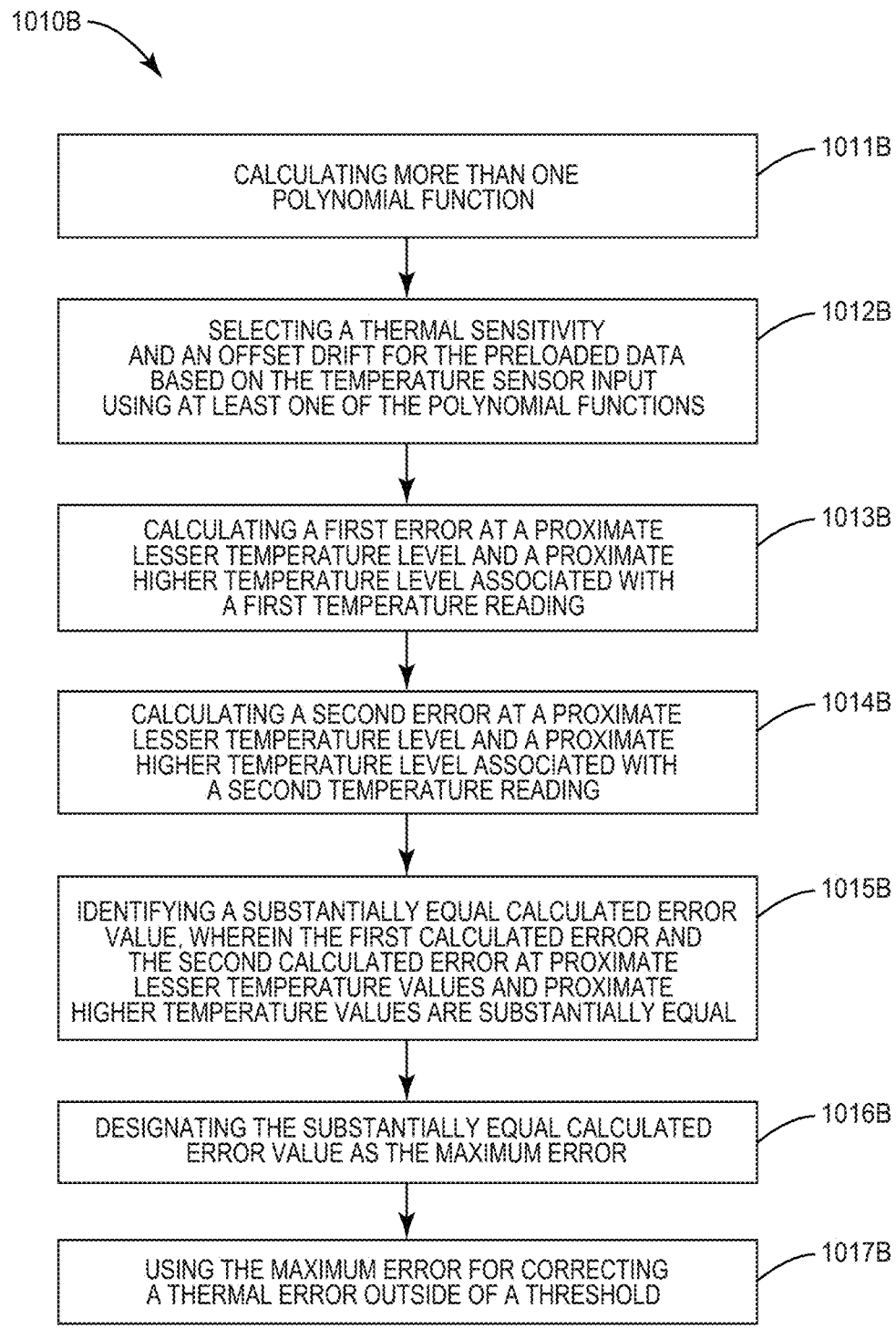

FIG. 10B is a flow chart of a method for optimizing error automation.

Figure 10C:
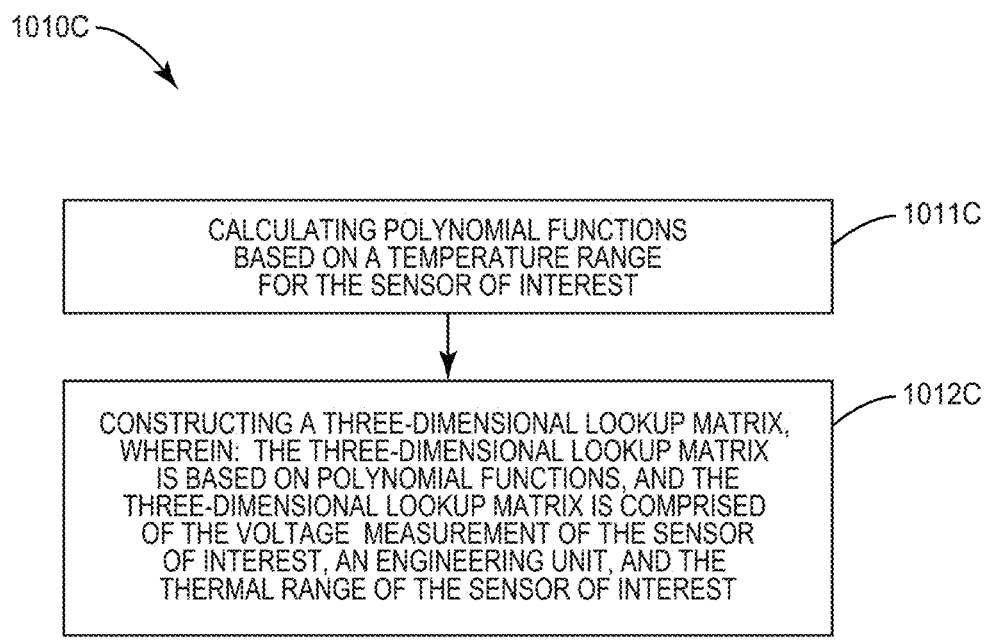

FIG. 10C is a flow chart of a method for three-dimensional lookup error elimination.

Figure 11:
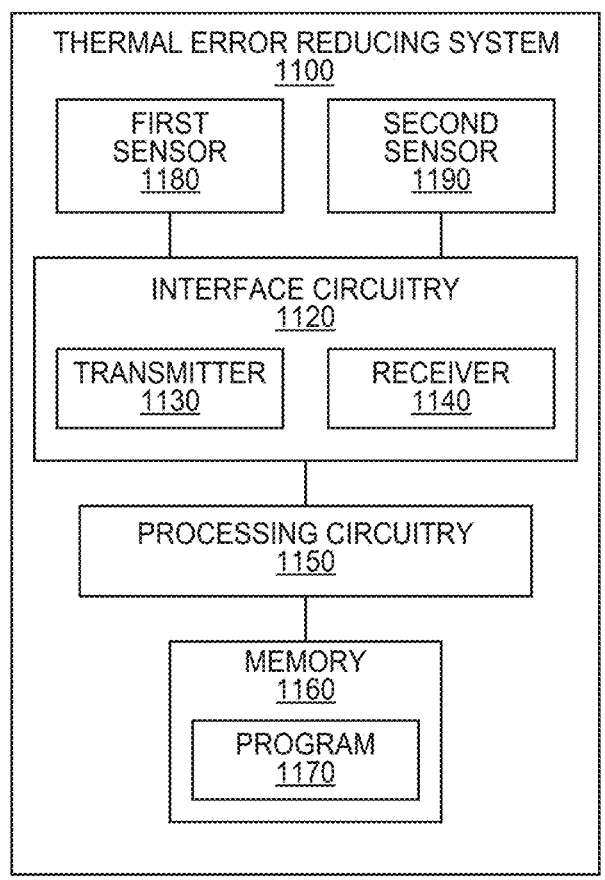

FIG. 11 is a block diagram of a thermal error reducing system for reducing thermal error real-time for a sensor in a region of interest of a vehicle.

Figure 12:
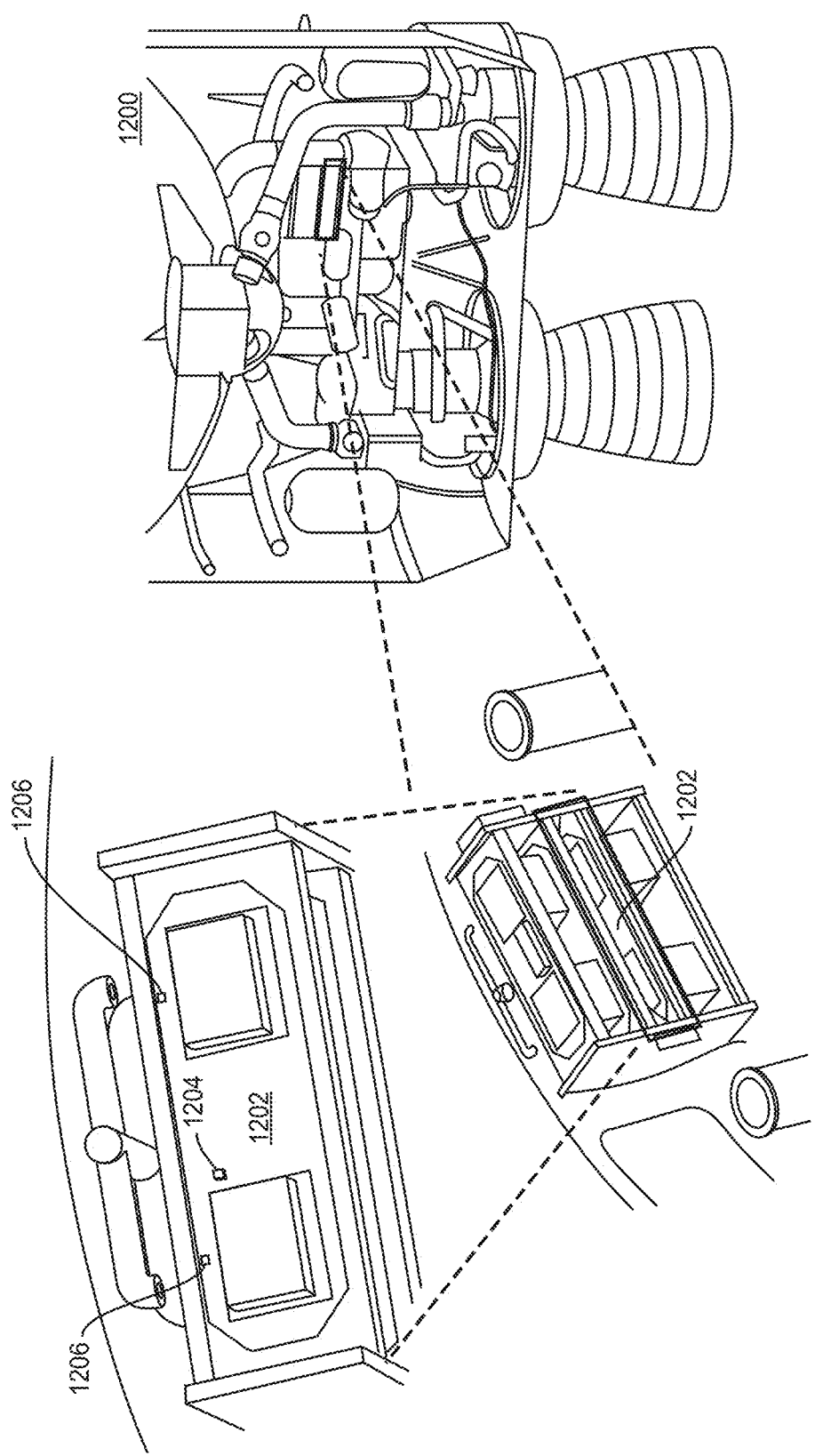

FIG. 12 is an illustration of a vehicle including a sensor of interest for reducing thermal error real-time.

DETAILED DESCRIPTION

The embodiments herein provide various methods, systems, and apparatuses to account for thermal error compensation. Three embodiments described below include midpoint temperature error reduction (MTER), optimization error automation (OEA), and three-dimensional lookup error elimination (3DLEE).

FIG. 2A is an illustration of a graphic representation 200 of thermal sensitivity percent change using MTER. Similar to FIG. 1A, the y-axis 204 is $x_s$ in percentage change. The x-axis 202 is temperature in Fahrenheit. In some embodiments of MTER, the three temperature values 210 are used to create the fit 208. Using this fit 208, two midpoints 214, $\alpha_1$, $\alpha_2$, are determined. With the midpoints 214, a maximum error 212 is shown between one midpoint 214 and the next temperature value 210.

FIG. 2B is an illustration of a graphic representation 250 of thermal zero offset percent change using MTER. Similar to FIG. 1B, the y-axis 254 is $b_z$ in percentage change. The x-axis 252 is temperature in Fahrenheit. In some embodiments of MTER, the three temperature values 258 are used to create the fit 256. Using this fit 256, two midpoints, $\alpha_1$, $\alpha_2$, are determined.

The midpoints must be within the following boundary regions according to a piecewise function for $\alpha_1$ and $\alpha_2$ shown in the following equation:

$$y_v = \begin{cases} m_{s1}x_{EU} + b_{z1}, & x < \alpha_1 \\ m_{s2}x_{EU} + b_{z2}, & \alpha_1 \le x < \alpha_2 \\ m_{s3}x_{EU} + b_{z3}, & x \ge \alpha_2 \end{cases}$$

where $y_v$ is voltage,
$m_s$ is sensitivity,
$X_{EU}$ is engineering units,
$b_z$ is zero offset,
$\alpha_1 = (T_1+T_2)/2$,
$\alpha_2 = (T_2+T_3)/2$, and
$T_i$ is the given temperature i=1, 2, 3, . . .

An advantage of MTER is it has the lowest computational complexity of the three methods (MTER, OEA, 3DLEE). The value a is picked as the midpoint between the temperature values. The error is the difference in y value between the actual value and the midpoint on the left or right. Since a midpoint is chosen, the error from left and right are not equal unless the fit 208 is a straight line with a slope of +/−1. Thus, the max error is used to calculate the error. If the actual value is less than $\alpha_1$, the first equation above is used. If the value is higher than $\alpha_2$, the third equation is used. If the value is between $\alpha_1$ and $\alpha_2$, the second equation is used. Since the error from left and right is not equal, this solution finds a which has the same error from left and right.

FIG. 3 is an illustration of a graphic representation 300 of thermal compensation using OEA. Similar to MTER, OEA determines α 302 using fitted quadratic equations 308b for $m_s$ and $b_z$:

$$m_s(T)=aT^2+bT+c$$

$$b_z(T)=a_1T^2+b_1T+c_1$$

In determining α 302, the error shown on the y-axis 306 can be the same in either direction of the x-axis 310a in the index if the same distance. The y-axis is measured with the applicable engineering unit, such as but not limited to gravity (g) as illustrated in FIG. 3. Using iterative equations, α is determined using the following equations:

$$V_{new}=m_{s\_mid}(g_{range})+b_{z\_mid};$$

$$\max_{left}(\text{index}_1)=\max|(\text{thermal}_{65\_sen\_values}-V_{new})|;$$
and $$\max_{right}(\text{index}_1)=\max|(\text{ser\_sens\_values}-V_{new})|$$

Once the maximum left and right values are determined, OEA determines the location optimized by finding the minimum absolute value of error:

$$\text{location}_\alpha=\text{find}|(\max_{left}-\max_{right})|==\min|(\max_{left}-\max_{right})|$$

The plot in FIG. 3 illustrates the difference in error from left and right. The objective of this method is to find the point where this difference is zero which is the index and where the error from left and right is the same value by iteration. Note that the location of α 302 is the index in iteration. Once found, the actual temperature value can be found using this index.

The example of FIG. 3 illustrates an example in which ninety (90) iterations are taken over a temperature range (e.g., −45° to +45°). A value is obtained at each iteration and shown in the plot of FIG. 3. On the seventy-sixth (76) iteration, the value is zero. At this value, the Vnew(locationa) is 30.

FIG. 4 is an illustration of a graphic representation 400 of thermal compensation results using OEA. In this example, the y-axis 410 is in g and the x-axis 418 is in mV. Three lines corresponding to three linear equations are shown: −65° F. sensitivity equation 414, optimized equation 416, and serial sensitivity equation 420. The process includes calculating multiple iterations within a temperature range. The multiple iterations calculated at multiple points of the temperature range results in the three lines 414, 416, 420 as illustrated in FIG. 4. Next, at each point the difference between the optimized line 416 and each of the other two lines 414, 420 is calculated. The method determines a line at which the distance between lines 414 and 416 is equal to the distance between lines 420 and 416 (i.e., line 416 is in the middle of lines 414, 420). This line corresponds to the temperature α.

In some implementations, for any temperature to the left of α, −65° F. sensitivity equation 414 is used, and for any temperature to the right side of a, serial sensitivity equation 420 is used. In such implementations, the maximum error is implied to be the same from both sides of the optimized 416. Thus, the maximum value will be used to determine root sum of squares calculations.

FIG. 5 is an illustration of a graphic representation of MTER and OEA accuracies. As shown in exemplary testing, MTER can meet accuracy requirements for error reduction at least half the time. OEA can meet accuracy requirements for error reduction over 80% of the time.

FIG. 6 is an illustration of a graphic representation 600 of MTER and OEA thermal compensation error reduction. The x-axis 602 is in percent of error reduced. The y-axis 604 is the percent of sensors in each reduction bucket based on the total number of sensors. Here, OEA and MTER seem to have similar results, the largest difference being at 40-50% error reduction.

FIG. 7A is an illustration of a graphic representation of 3DLEE.

In this method, for every temperature an equation is generated using the fitted polynomial in the previous MTER and OEA methods:

$$m_s(T)=aT^2+bT+c$$

$$b_z(T)=a_1T^2+b_1T+c_1$$

This implies, that there are N many equations for N many temperatures to determine a spectrum of readings. 3DLEE can require more processing power than MTER or OEA. However, in some embodiments, the error is almost eliminated. As shown, the y-axis is temperature, the x-axis is in g, and the z-axis is in mV.

In some embodiments, T ranges from:

$$T_{min}:\beta:T_{max}$$

where β is the quantization level.

$$\beta=1, 2, 3, \ldots, N$$

$$N=(T_{max}-T_{min})/\beta$$

N is the number of equations used for compensation.

FIG. 7B is another illustration of a graphic representation of 3DLEE.

FIG. 8A is an illustration of a graphic representation of 3DLEE. The data presented is not in a smooth form, but lines providing discrete amounts of data. In this example, β=10. It is important to note, as β the computational power can decrease, depending on the applications and accuracy requirement.

FIG. 8B is an illustration of a graphic representation of 3DLEE. As shown, the lower portion of the quantization is non-linear.

FIG. 9 is an illustration of a graphic representation of 3DLEE. The quantization shown is a zoomed-in view of the non-linear portion of FIG. 8B and shows less quantization, similar to the quantization in FIG. 8A, on the right hand portion of the break.

FIG. 10 is a flow chart outlining non-limiting methods according to present aspects and including a method 1000 for reducing thermal induced error in real-time for a sensor in a region of interest of a vehicle. The method includes receiving 1002 at least one data point (e.g., a temperature reading) from a temperature sensor, the temperature sensor is configured to determine the temperature for the sensor of interest. In some embodiments, the temperature sensor comprises at least one of a resistance temperature detector and a thermocouple. In some embodiments, the sensor of interest comprises at least one of an accelerometer, a strain gauge, a pressure transducer, and a microphone.

The method 1000 further includes receiving 1004 at least one data point from the sensor of interest, the sensor of interest having thermal sensitivity and offset shift for a given temperature range.

The method 1000 further includes calculating 1006 real-time sensor thermal error reduction. The calculation 1006 includes using polynomial functions within a temperature reading range determined by the temperature sensor, wherein the polynomial functions are based on preloaded data for the sensor of interest. In some embodiments, the preloaded data comprises thermal sensitivity and zero shift data.

In some embodiments, the method 1000 can perform thermal compensation to the portion of the vehicle using the real-time sensor thermal error reduction.

FIG. 10A is a flow chart of a method 1010A for using a midpoint temperature error reduction. The method 1010A includes determining 1011A at least three percentage change coefficients for thermal sensitivity.

The method 1010A further includes determining 1012A at least three percentage change coefficients for thermal zero offset.

The method further includes curve-fitting 1013A more than one polynomial function using regression analysis within the temperature reading range of the temperature sensor.

The method 1010A further includes determining 1014A at least two boundary regions for the piecewise functions, wherein each of the boundary regions are calculated based on the preloaded data.

The method 1010A further includes selecting 1015A a boundary condition to reduce sensor thermal error using at least one of the thermal sensitivity percentage change coefficients and at least one of the thermal zero offset percentage change coefficients.

FIG. 10B is a flow chart of a method 1010B for optimizing error automation. The method 1010B includes calculating 1011B more than one polynomial function.

The method 1010B includes selecting 1012B a thermal sensitivity and an offset drift for the preloaded data based on the temperature sensor input using at least one of the polynomial functions.

The method 1010B includes calculating 1013B a first error at a proximate lesser temperature level and a proximate higher temperature level associated with a first temperature reading.

The method 1010B includes calculating 1014B a second error at a proximate lesser temperature level and a proximate higher temperature level associated with a second temperature reading.

The method 1010B includes identifying 1015B a substantially equal calculated error value, wherein the first calculated error and the second calculated error at proximate lesser temperature values and proximate higher temperature values are substantially equal.

The method 1010B includes designating 1016B the substantially equal calculated error value as the maximum error.

The method 1010B includes using 1017B the maximum error for correcting a thermal error outside of a threshold. In some embodiments, the threshold is calculated using a midpoint error reduction.

FIG. 10C is a flow chart of a method 1010C for three-dimensional lookup error elimination. The method 1010C includes calculating 1011C polynomial functions based on a temperature range for the sensor of interest.

The method 1010C includes constructing 1012C a three-dimensional lookup matrix, wherein: the three-dimensional lookup matrix is based on polynomial functions, and the three-dimensional lookup matrix is comprised of the voltage measurement of the sensor of interest, an engineering unit, and the thermal range of the sensor of interest.

FIG. 11 is a block diagram of a thermal error reducing system for reducing thermal induced error in real-time for a sensor in a region of interest of a vehicle. FIG. 11 illustrates a system 1100 according to some example implementations of the present disclosure. Generally, a system of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The electronic device can be a server, such as a singular device on the vehicle or two separate devices, such as an onboard computing device and a diagnostic computing device. The system may include one or more of each of a number of components such as, for example, processing circuitry 1150 (e.g., processor unit) connected to a memory 1160 (e.g., storage device).

The processing circuitry 1150 may be composed of one or more processors alone or in combination with one or more memories. The processing circuitry is generally any piece of computer hardware that is capable of processing information such as, for example, data, computer programs or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1160 (of the same or another system).

The processing circuitry 1150 may be a number of processors, a multi-core processor or some other type of processor, depending on the particular implementation. Further, the processing circuitry 1150 may be implemented using a number of heterogeneous processor systems in which a main processor is present with one or more secondary processors on a single chip. As another illustrative example, the processing circuitry 1150 may be a symmetric multi-processor system containing multiple processors of the same type. In yet another example, the processing circuitry 1150 may be embodied as or otherwise include one or more ASICs, FPGAs or the like. Thus, although the processing circuitry 1150 may be capable of executing a computer program to perform one or more functions, the processing circuitry 1150 of various examples may be capable of performing one or more functions without the aid of a computer program. In either instance, the processing circuitry 1150 may be appropriately programmed to perform functions or operations according to example implementations of the present disclosure.

The memory 1160 is generally any piece of computer hardware that is capable of storing information such as, for example, data, computer programs (e.g., computer-readable program code 1170) or other suitable information either on a temporary basis or a permanent basis. The memory 1160 may include volatile and non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory 1160 may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1160, the processing circuitry 1150 may also be connected to one or more interfaces for displaying, transmitting and receiving information. The interfaces may include interface circuitry (e.g. a communications interface) 1120. The interface circuitry 1120 may be configured to transmit and receive information, such as to and from other apparatus(es), network(s) or the like. The interface circuitry 1120 may be configured to transmit and receive information by physical (wired) and wireless communications links. Examples of suitable communication interfaces include a network interface controller (NIC), wireless NIC (WNIC) or the like. The interface circuitry 1120 may have one or more transmitters 1130. The interface circuitry 1120 may have one or more receivers 1140.

The interface circuitry 1120 can also be connected to a first sensor 1180 and a second sensor 1190. The first sensor 1180 may be a temperature sensor. The second sensor 1190 may be a sensor of interest 1190, such as an accelerometer, a strain gauge, a pressure transducer, and a microphone.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and execution may be performed in parallel such that multiple instructions are retrieved, loaded, and executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, a system 1100 may include a processing circuitry 1150 and a computer-readable storage medium or memory 1160 coupled to the processing circuitry, where the processing circuitry is configured to execute computer-readable program code 1170 stored in the memory. It will also be understood that one or more functions, and combinations of functions, may be implemented by special purpose hardware-based computer systems or processing circuitry s which perform the specified functions, or combinations of special purpose hardware and program code instructions.

FIG. 12 is an illustration of a vehicle 1200 including a sensor of interest for reducing thermal induced error in real-time. The vehicle 1200 includes a component 1202. The component 1202 as shown has multiple parts, including a sensor of interest 1204 and at least one thermal sensor 1206.

The present application may, of course, be carried out in other ways than those specifically set forth herein without departing from essential characteristics of the subject matter. The present embodiments are to be considered in all respects as illustrative and not restrictive, and all changes coming within the meaning and equivalency range of the appended claims are intended to be embraced therein.

What is claimed is:

1. A system for reducing thermal induced error in real-time for a sensor in a region of interest of a vehicle, the system comprising:
    a sensor of interest having a thermal sensitivity and an offset shift for a given temperature range;
    a temperature sensor, the temperature sensor configured to determine a temperature for the sensor of interest;
    a memory; and
    a processor coupled to the memory, wherein the processor is configured to execute instructions to:
    calculate real-time sensor thermal error reduction data;
    wherein the processor is configured to use midpoint temperature error reduction to calculate the real-time sensor thermal error reduction, the processor configured to execute instructions to:
    determine multiple percentage change coefficients for the thermal sensitivity;
    determine multiple percentage change coefficients for thermal zero offset;
    within a temperature reading range determined by the temperature sensor, curve-fit more than one polynomial function using regression analysis;
    determine at least two boundary regions; and
    select a boundary condition to reduce sensor thermal error using at least one of the thermal sensitivity percentage change coefficients and at least one of the thermal zero offset percentage change coefficients.

2. The system of claim 1, further comprising using the real-time thermal error reduction data to perform real-time thermal compensation for the sensor of interest.

3. The system of claim 1, wherein calculating the real-time sensor thermal error reduction further comprises:
    determining at least three of the percentage change coefficients for the thermal sensitivity, determining at least three of the percentage change coefficients for the thermal zero offset,
    within the temperature reading range of the temperature sensor, curve-fitting more than one of the polynomial functions using regression analysis;
    determining at least two of the boundary regions for piecewise functions, wherein each of the boundary regions are calculated based on preloaded data for the sensor of interest; and
    selecting the boundary condition to reduce the sensor thermal error using at least one of the thermal sensitivity percentage change coefficients and at least one of the thermal zero offset percentage change coefficients.

4. The system of claim 1, wherein the temperature sensor comprises at least one of a resistance temperature detector and a thermocouple.

5. The system of claim 1, wherein the sensor of interest comprises at least one of an accelerometer, a strain gauge, a pressure transducer, and a microphone.

6. The system of claim 1, further comprising performing thermal compensation to a portion of the vehicle using the real-time sensor thermal error reduction data.

7. A method for reducing thermal induced error in real-time for a sensor in a region of interest of a vehicle, the method comprising:
   receiving at least one data point from a temperature sensor, the temperature sensor configured to determine a temperature for a sensor of interest;
   receiving at least one data point from the sensor of interest, the sensor of interest having a thermal sensitivity and an offset shift for a given temperature range; and
   calculating real-time sensor thermal error reduction data;
   wherein calculating the real-time sensor thermal error reduction data comprises optimizing error automation, comprising:
   calculating more than one polynomial functions;
   using at least one of the polynomial functions, selecting a thermal sensitivity and an offset drift for preloaded data for the sensor of interest based on the temperature sensor input;
   calculating a first error at a proximate lesser temperature level and a proximate higher temperature level associated with a first temperature reading;
   calculating a second error at a proximate lesser temperature level and a proximate higher temperature level associated with a second temperature reading;
   identifying a substantially equal calculated error value, wherein the first calculated error and the second calculated error are at proximate lesser temperature values and proximate higher temperature values are substantially equal;
   designating the substantially equal calculated error value as a maximum error; and
   using the maximum error for correcting a thermal error outside of a threshold.

8. The method of claim 7, further comprising using the real-time sensor thermal error reduction data to perform real-time thermal compensation in the region of interest.

9. The method of claim 7, further comprising using the real-time thermal error reduction data to perform real-time thermal compensation for the sensor of interest.

10. A non-transitory computer-readable storage medium for thermal induced error in real-time reduction for a sensor in a region of interest of a vehicle, the computer readable storage medium being non-transitory and having computer-readable program code portions stored therein that in response to execution by processing circuitry, cause an apparatus to at least:
    receive at least one data point from a first sensor, the first sensor configured to determine temperature readings;
    receive at least one data point from a sensor of interest, the sensor of interest having a thermal sensitivity and an offset shift for a given temperature range; and
    calculate real-time sensor thermal error reduction data;
    wherein calculating the real-time sensor thermal error reduction comprises optimizing error automation, comprising:
    calculate more than one polynomial function,
    use at least one of the polynomial functions, selecting a thermal sensitivity and an offset drift for preloaded data for the sensor of interest based on the first sensor input,
    calculate a first error at a proximate lesser temperature level and a proximate higher temperature level associated with a first temperature reading,
    calculate a second error at a proximate lesser temperature level and a proximate higher temperature level associated with a second temperature reading,
    identify a substantially equal calculated error value, wherein the first calculated error and the second calculated error at proximate lesser temperature values and proximate higher temperature values are substantially equal,
    designate the substantially equal calculated error value as a maximum error, and
    use the maximum error for correcting a thermal error outside of a threshold.

11. The system of claim 1, wherein the processor is further configured to calculate the real-time sensor thermal error reduction data using optimized error automation.

12. The system of claim 1, wherein the processor is further configured to calculate the real-time sensor thermal error reduction data using three-dimensional lookup error elimination.

13. The method of claim 7, wherein receiving the at least one data point from the temperature sensor comprises receiving the at least one data point from at least one of a resistance temperature detector and a thermocouple.

14. The method of claim 7, wherein receiving the at least one data point from the sensor of interest comprises receiving the at least one data point from at least one of an accelerometer, a strain gauge, a pressure transducer, and a microphone.

15. The method of claim 7, further comprising performing thermal compensation to a portion of the vehicle using the real-time sensor thermal error reduction data.

16. The method of claim 7, further comprising calculating the real-time sensor thermal error reduction using three-dimensional lookup error elimination.

17. The non-transitory computer-readable storage medium of claim 10, wherein receiving the at least one data point from a first sensor comprises receiving the at least one data point from at least one of a resistance temperature detector and a thermocouple.

18. The non-transitory computer-readable storage medium of claim 10, wherein receiving the at least one data point from the sensor of interest comprises receiving the at least one data point from at least one of an accelerometer, a strain gauge, a pressure transducer, and a microphone.

19. The non-transitory computer-readable storage medium of claim 10, further comprising performing thermal compensation to a portion of the vehicle using the real-time sensor thermal error reduction data.

20. The non-transitory computer-readable storage medium of claim 10, further comprising calculating the real-time sensor thermal error reduction using three-dimensional lookup error elimination.

* * * * *